United States Patent [19]

Achee et al.

[11] Patent Number: 4,565,458
[45] Date of Patent: Jan. 21, 1986

[54] ROLLER BEARING

[75] Inventors: John D. Achee; Anthony Cuozzo, both of Torrington, Conn.

[73] Assignee: The Torrington Company, Torrington, Conn.

[21] Appl. No.: 628,957

[22] Filed: Jul. 9, 1984

Related U.S. Application Data

[63] Continuation of Ser. No. 353,673, Mar. 1, 1982.

[51] Int. Cl.$^4$ .................... F16C 43/04; F16C 33/64
[52] U.S. Cl. .................................. 384/561; 384/564
[58] Field of Search ............ 308/207 R, 210, 212, 308/213, 216, 235, DIG. 11; 29/149.4 R, 149.4 A, 149.5 R; 384/561, 559, 564, 569

[56] References Cited

U.S. PATENT DOCUMENTS

| | | | |
|---|---|---|---|
| 1,512,020 | 10/1924 | Graham | 308/213 |
| 1,970,449 | 8/1934 | Gibbons et al. | 308/212 |
| 2,567,242 | 9/1951 | Smith | 308/213 |
| 3,230,023 | 1/1966 | Dahl et al. | 308/213 X |

FOREIGN PATENT DOCUMENTS 493886  10/1938  United Kingdom ............... 208/213

Primary Examiner—Donald Watkins
Assistant Examiner—Thomas R. Hannon
Attorney, Agent, or Firm—Frank S. Troidl

[57] ABSTRACT

The bearing comprises a roller race formed from flat sheet material. The roller race has a roller raceway and an indent. A plurality of rollers are in contact with the roller raceway and are located in the roller race. A split ring spring member provides an axial thrust face for the rollers.

The formed roller race is heat-treated. The rollers are inserted into the formed race in a single step; the split ring spring member is then placed into the indent to provide the axial thrust face for the rollers.

2 Claims, 7 Drawing Figures

U.S. Patent   Jan. 21, 1986   4,565,458
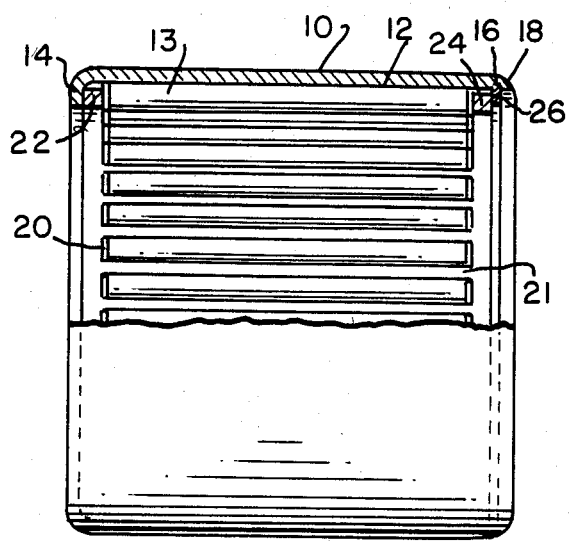
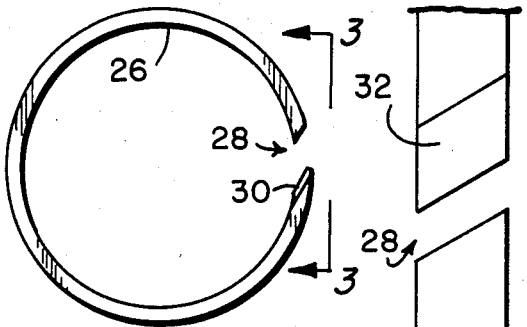
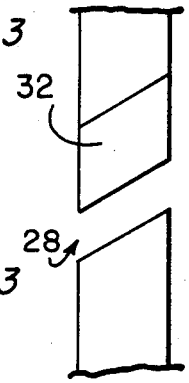
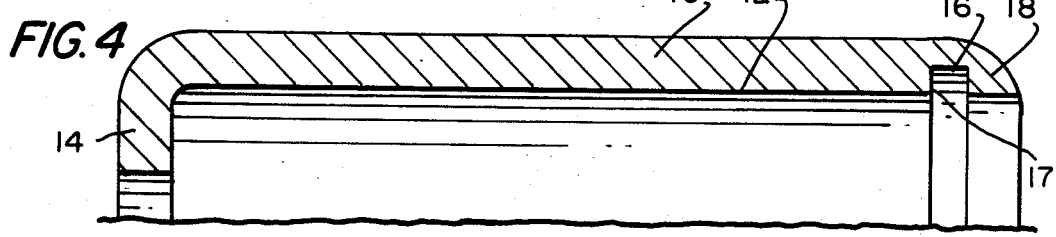
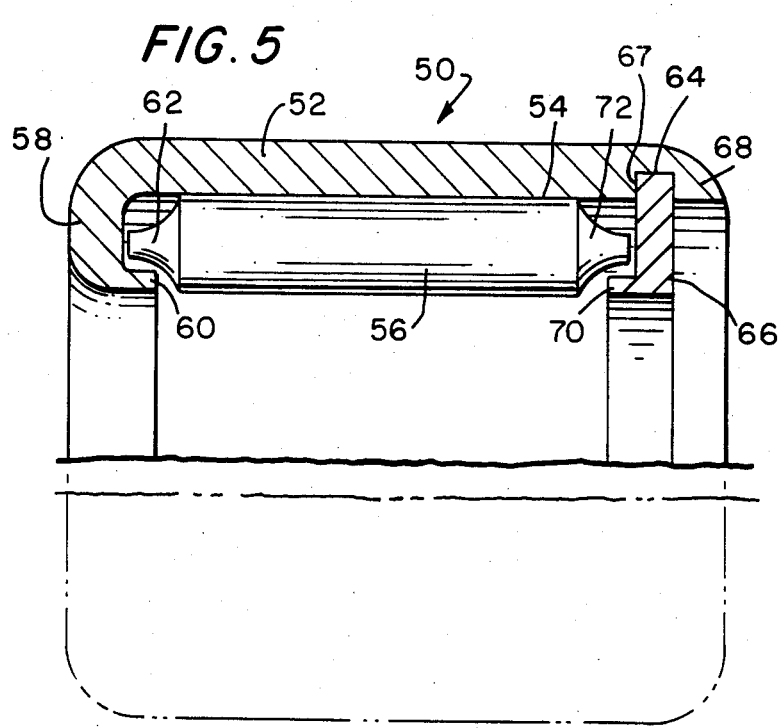
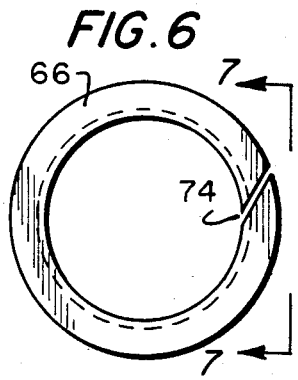
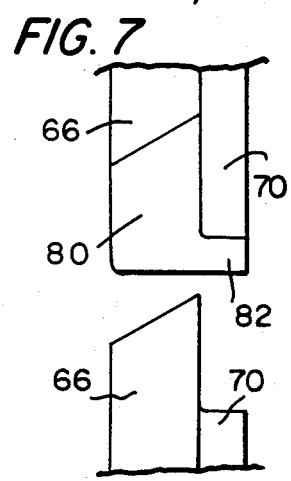

ROLLER BEARING

This application is a continuation of application Ser. No. 353,673 filed Mar. 1, 1982.

This invention relates to roller bearings with a roller race made from flat sheet metal. More particularly this invention is a new roller bearing of the type including a roller race made from flat sheet metal and a new method of making such roller bearing.

One method of making a roller bearing is to form a race with end flanges from flat sheet metal. Preferably the sheet metal is drawn or formed between male and female dies which press the flat stock into a tube which is closed or flanged at one end. However, at some point the formed race, which is made of low carbon steel, must be carburized to harden it. However, once the tubular part of the formed race is carburized and hardened, it cannot be bent without forming cracks. Thus, a common practice in making formed races is to take the formed sheet low carbon metal, and copper plate the outside surface to a point slightly below the end of the raceway. The thus prepared tube is then carburized by placing into a furnace. The copper plate acts as a barrier to carbon in the carburizing process and prohibits hardening of a surface so covered. After the heat treatment the copper plate is stripped from the heat-treated race by immersing in a cyanide bath. The rolling means such as loose rollers or rollers in a cage is placed in the hardened tubular member and then the open end is bent over to retain the rolling means in the race.

Strict EPA requirements govern the disposal of the spent cyanide bath used in removing the copper plate. The EPA requirement, therefore, substantially increased the cost of producing the formed race roller bearing. Also, cyanide has a very pungent, disagreeable odor and it is undesirable in a bearing manufacturing plant.

With our invention, a roller bearing including a formed race is made without requiring the application of any copper plating and, therefore, eliminates the need for the use of cyanide.

Briefly described, our new method of making a roller bearing comprises the steps of forming a tubular race having at least one indent means on its inside periphery from flat strip metal, carburizing and hardening the tubular race. In one step, roller means such as loose rollers or rollers in a cage are inserted into the formed race. A split ring member is fitted into the indent means to provide an axial thrust face for the roller means.

Briefly described, our new roller bearing comprises a roller race formed from flat sheet metal. The roller race has a roller raceway and indent means such as at least one circumferential groove. Roller means including a plurality of rollers in contact with the roller raceway are located within the roller race. The roller means, for example, may be loose rollers, such as trunnion rollers or square-ended rollers in a cage. A split ring member having portions thereof extending into the indent means provides an axial thrust face for the roller means.

The invention as well as its many advantages may be further understood by reference to the following detailed description and drawings in which:

FIG. 1 is an elevational view, partly in section, showing one preferred embodiment of our invention;

FIG. 2 is a plan view of the split ring used in the embodiment of FIG. 1;

FIG. 3 is a fragmentary view, greatly enlarged, of the spring member of FIG. 2 and taken along lines 3—3 of FIG. 2;

FIG. 4 is an enlarged fragmentary, sectional view of the formed tubular roller race of FIG. 1;

FIG. 5 is a fragmentary elevational, sectional view of a second preferred embodiment of the invention;

FIG. 6 is a plan view of the split ring of FIG. 5; and

FIG. 7 is a fragmentary view on a greatly enlarged scale taken along lines 7—7 of FIG. 6.

In the various figures, like numbers refer to like parts.

Referring to the drawings, and more particularly, to FIG. 1 and FIG. 4, the roller bearing includes a tubular roller race 10 formed from flat sheet metal. The tubular roller race has a roller raceway 12 on its inside periphery. The raceway 12 is that longitudinal portion of the inside periphery of the race 10 which is contacted by rollers 13.

The formed race has an inwardly-turned flange 14 at one end. Adjacent the other end of the formed race 10 an indent means such as a circumferential groove 16 is formed on the inside periphery of the formed race 10 by the annular shoulder 17 and an integral flange 18 which is turned inwardly through an angle of approximately 90 degrees. However, note particularly that the inside diameter of the flange 18 is substantially the same or only slightly less than the diameter of the raceway 12.

The roller means in FIG. 1 is a cage containing the rollers 13. The rollers are located within pockets 20 in the roller cage formed by cross-bars 21 interconnecting end rims 22 and 24.

A split ring 26 is fitted in the formed race 10. The split ring has its outer edge fitted in the circumferential groove 16 on the race 10 and extends inwardly toward the axis of the bearing. Flange 14 provides an axial thrust face for the rim 22; the split ring 26 provides an axial thrust face for the rim 24.

If desired, a second circumferential groove with a second split ring may be substituted for the flange 14 at the sacrifice of some bearing strength.

As can be seen from FIG. 2 and FIG. 3 the split ring 26 is split at 28. Each split part includes angled edges such as the angled edge 30 (see FIG. 2) and the angled edge 32 (see FIG. 3). When the split ring 26 is inserted into the circumferential groove 16 the edges 30 and 32 complement one another.

In making our new roller bearing the race 10 including flange 14, groove 16, and flange 18 is first formed from flat strip low carbon steel in the soft before heat-treatment to carburize and harden the race. The cage with its rollers is inserted into the race 10 followed by the split ring 26. This method eliminates the steps of copper plating, stripping off the copper plate, and curling after loading the rolling elements. Since the new method does not require copper plate, the cyanide is not used.

In the embodiment of FIG. 5 the formed race 50 includes a tubular portion 52 and an inside perimeter which includes a longitudinal portion 54 providing a raceway for the trunnion rollers 56. The flange 58 at one end of the formed race 50 has an axially-extending lip 60 which supports the end 62 of the trunnion roller 56. A circumferential groove 64 in which is fit the split ring 66 is located adjacent the other end of the formed race 50. The circumferential groove is formed by annular shoulder 67 and an integral flange 68 turned inwardly through an angle of approximately 90 degrees. As in the other embodiment, the inside perimeter of the flange 68 is of substantially the same diameter as the diameter of the raceway 54. The split ring 66 includes an annular portion with its outer edge fitting in the circumferential groove 64 and an axial lip 70 which supports the end 72 of trunnion roller 56.

Though only one roller is shown in FIG. 5, it is to be understood that a plurality of trunnion rollers 56 fill the entire periphery of the raceway 54.

As shown in FIG. 6, the split ring is split at 74. The split extends through the annular portion 66 and lip 70.

FIG. 7 is a view taken along lines 7—7 of FIG. 6 but on a much larger scale with the split 74 of the split ring separated to more clearly show that the contacting surfaces, such as surfaces 80 and 82 on portion 66 and lip 70, respectively, are generally diagonally cut so that surfaces 80 and 82 will complement similar complementary surfaces on the split ring when the split ring is placed in the groove 64.

The method of making the formed race roller bearing of FIG. 5 is similar to the method of making the formed race roller bearing of FIG. 1. The race 50 is first formed from a flat strip stock with a tubular portion 52, a flange 58 provided with the lip 60 and groove 64. The race 50 is heat-treated to carburize and then the race is hardened. The flange 68 has an inside diameter sufficiently large enough to permit the one-step insertion of all of the required trunnion rollers 56. Thereafter, the split ring is placed within the groove 64. The flange 58 and lip 60 provide an axial thrust face and support, respectively, at one end for the trunnion rollers 56 and the annular portion 66 and lip 70 of the split ring provide an axial thrust face and support, respectively, for the other end of trunnion rollers 56.

I claim:

1. A roller bearing comprising: a carburized and hardened member formed in the soft from low carbon flat sheet metal, and having a tubular roller race with a longitudinal portion thereof providing a roller raceway; said member having an integral inwardly-turned flange at one end to provide an axial thrust face at one end of a roller means, the other end of said member having an annular shoulder and an integral flange turned inwardly through an angle of approximately 90 degrees to form a circumferential groove with the flange having an inside diameter sufficiently large to permit the easy insertion of roller means; roller means inserted in said member and including a plurality of rollers in contact with the roller raceway; and a split ring having a portion thereof inserted into the circumferential groove and constructed to provide an axial thrust face for the roller means.

2. A roller bearing comprising: a member formed from flat sheet metal in the soft before heat-treatment and having a tubular roller raceway and a circumferential groove formed adjacent one end of said member to provide an integral flange extending inwardly at an angle of approximately 90 degrees, the inside diameter of said flange being sufficiently large to permit the easy insertion of roller means; roller means inserted in said member and including a plurality of rollers in contact with the roller race-way; a split ring having a portion thereof inserted into the circumferential groove and constructed to provide an axial thrust face for the roller means; said means having an integral inwardly-turned flange at its other end to provide an axial thrust face at said other end for the roller means.

* * * * *